US008010102B2

(12) United States Patent
Glick et al.

(10) Patent No.: US 8,010,102 B2
(45) Date of Patent: Aug. 30, 2011

(54) METHOD AND APPARATUS FOR COGNITIVE RADIO POLICY CHANGE

(75) Inventors: Ellis W. Glick, Northbrook, IL (US); Michael D. Kotzin, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 12/780,409

(22) Filed: May 14, 2010

(65) Prior Publication Data

US 2010/0220686 A1 Sep. 2, 2010

Related U.S. Application Data

(62) Division of application No. 11/614,383, filed on Dec. 21, 2006, now abandoned.

(51) Int. Cl.
*H04W 4/00* (2009.01)
*H04B 7/00* (2006.01)

(52) U.S. Cl. ............... 455/432.2; 455/41.2; 455/518; 455/519; 455/520

(58) Field of Classification Search ................. 455/41.2, 455/518–520, 432.2
See application file for complete search history.

(56) References Cited

U.S. PATENT DOCUMENTS

| 2001/0031625 | A1* | 10/2001 | Lynn | 455/67.1 |
|---|---|---|---|---|
| 2002/0098849 | A1* | 7/2002 | Bloebaum et al. | 455/456 |
| 2004/0022221 | A1* | 2/2004 | Chwieseni et al. | 370/338 |
| 2006/0143297 | A1* | 6/2006 | Korhonen et al. | 709/227 |
| 2006/0211404 | A1* | 9/2006 | Cromp et al. | 455/405 |
| 2007/0268516 | A1* | 11/2007 | Bugwadia et al. | 358/1.15 |

* cited by examiner

*Primary Examiner* — Marisol Figueroa

(57) ABSTRACT

A method of operation of a cognitive radio in a hierarchical group of cognitive radios, the hierarchy of cognitive radios including at least one master cognitive radio that has a higher position in the hierarchy than another of the cognitive radios in the group, consistent with the present invention, involves establishing a first operational policy for the group of cognitive radios; determining that the operational policy is unsuitable for use by at least one member of the group; and the master cognitive radio dictating a change in the operational policy used by the group to a second operational policy for use by the group.

16 Claims, 9 Drawing Sheets

METHOD AND APPARATUS FOR COGNITIVE RADIO POLICY CHANGE

CROSS-REFERENCE TO RELATED APPLICATIONS

This application is a divisional of, and claims priority and full benefit under 35 USC §120 of U.S. patent application Ser. No. 11/614,383, entitled Method and Apparatus for Cognitive Radio Policy Change, filed on Dec. 21, 2006, and assigned to Motorola, Inc.

FIELD OF THE INVENTION

The present invention relates generally to, in certain embodiments, the field of software defined radios and cognitive radios. More particularly, certain embodiments consistent with this invention relate to methods and apparatus for establishing an operational policy for such radios.

BACKGROUND

Radio communication technology has traditionally been based upon fixed frequency or spectrum assignments and fixed modulation techniques (as well as other regulatory agency established parameters). For example, a particular local government agency such as a police department might be assigned several frequencies for its use using frequency modulation for voice communication. Frequency spectrum could often be shared amongst groups of users in order to more efficiently use the spectrum by, for example, sub-audible digital or analog coding embedded in the transmitted signals. Nevertheless, in such an environment, the assigned frequencies are off limits for use by others and usage would rarely approach full utilization. In fact, utilization might amount to only a few percent of the available communication throughput. As a result, frequency spectrum is inefficiently utilized, while simultaneously demand for bandwidth is ever increasing.

A new paradigm for dealing with such a problem is emerging in which a radio is provided with the intelligence to identify underutilized or unutilized spectrum and change its operational parameters to take advantage of the available spectrum while minimizing potential for causing interference. Such radios are commonly configurable and reconfigurable using software control and posses the intelligence to obtain the needed situational awareness to reconfigure in order to enhance spectrum utilization efficiency. Such radios have been dubbed cognitive radios—a form of software defined radio. Cognitive radios are envisioned to be able to cross geographic boundaries and adapt to regulatory changes associated therewith.

One issue that is to be addressed in producing a viable working cognitive radio is the issue of adaptation to new policies as a radio's situation or environment changes. This can happen, for example, by virtue of changes in a geographically static environment as well as changes resulting from geographical movement of the radio (e.g., in an automobile or an airplane). The cognitive radio should be able to competently adapt to such situations

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
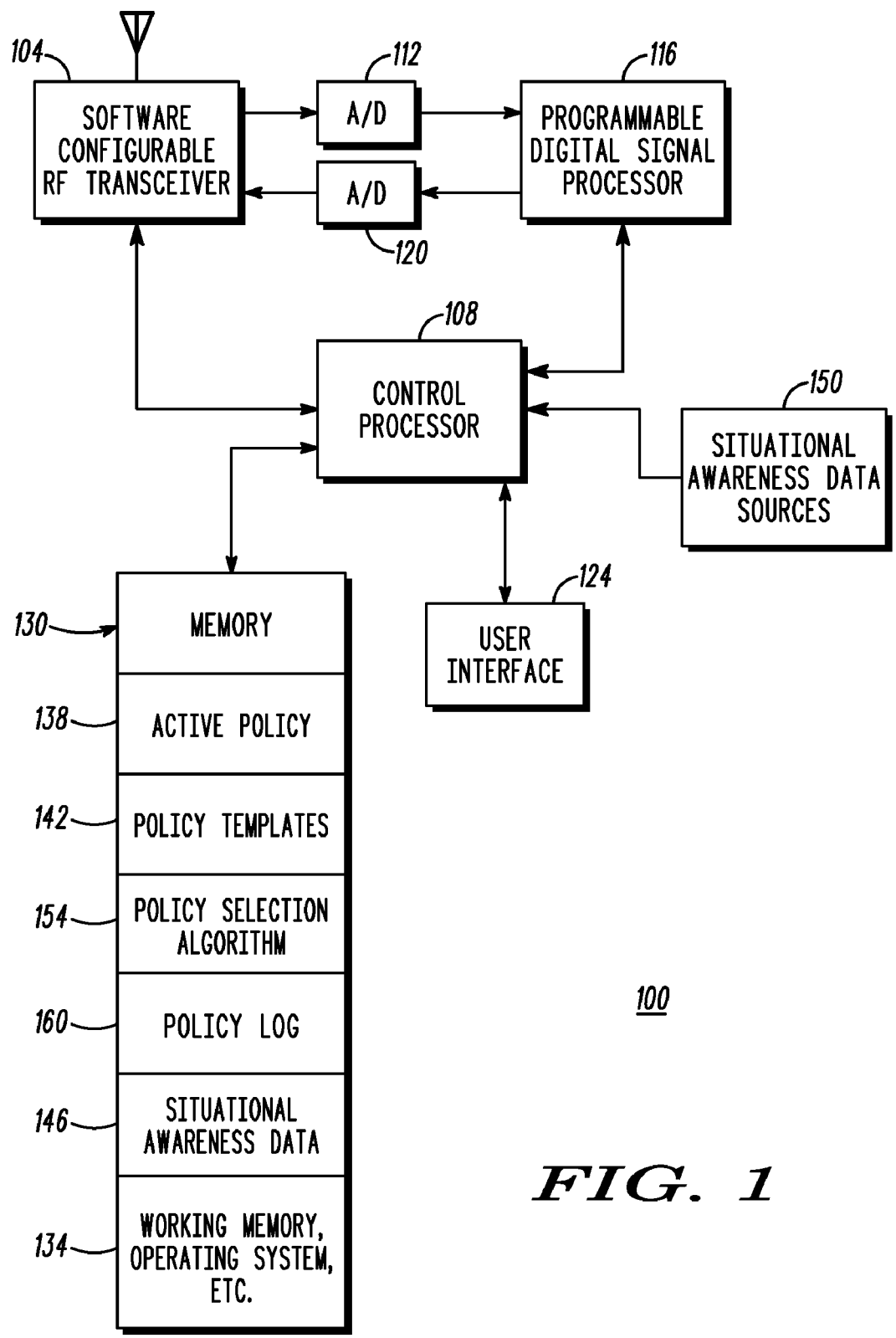
FIG. 1 is an example block diagram of a cognitive radio in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail example embodiments that are in accordance with the present invention, it should be observed that the embodiments reside primarily in combinations of method steps and apparatus components related to the cognitive radio and related processes. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the cognitive radio described herein. The non-processor circuits may include, but are not limited to, a radio receiver, a radio transmitter, signal drivers, clock circuits, power source circuits, and user input devices. As such, these functions may be interpreted as a method to perform functions such as acquisition of a new policy in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the term "policy" or "operational policy" is used to generically describe a rule or set of rules that define a parameter or a collection of parameters that specify a communication protocol and related specifications for use in radio communication. Those rules, for example, determine the type of waveforms used in modulation of information used for communication. Such policies and parameters thereof may be established or limited by convention, by agreement or by law. Examples of policies and components of policies include, but are not limited to, frequency or frequencies or frequency band, power limits, application, location, situation, wave shape, spectral characteristics, temporal characteristics, packet or other data formats, modulation technique, operational mode, coding, bandwidth, data throughput, encryption parameters and other communication parameters that might be used to specify the operation of a radio communication device.

A policy may be fully defined in some embodiments by a policy identifier or policy code, while in other embodiments, a policy may be identified by the specific parameters and specifications. In still other embodiments, the policy may be identified by a difference between two policies, or by a policy identification with exceptions, or by compressed data explaining, defining or labeling the policy. Any number of other techniques may be devised to identify a policy without deviation from the principles governing embodiments consistent with the present invention.

For purposes of this document, the term "domain" or "policy domain" is intended to mean a geographical region or other operational constraint in which a particular policy is in force—generally by virtue of regulations established by a regulating authority (e.g., in the U.S., the Federal Communication Commission is one such regulatory authority). It is noted that a policy domain may include radio spectrum that is unregulated or is nearly unregulated, and which can be utilized in accordance with certain embodiments as well as licensed spectra.

For purposes of this document, the term "software defined radio" (SDR) is intended to mean a radio communication device whose operational parameters are established by software. Thus, an SDR may be configured and reconfigured under software control to comply with a particular set of operational parameters (i.e., a policy). An example SDR may operate in multiple bands and in multiple modes.

For purposes of this document, the term "cognitive radio" (CR) is used to mean a configurable radio such as a software defined radio that has the ability to configure itself for operation based upon its operational environment. That is, a CR is able to determine or seek out an operational policy applicable to its capability, location, applicable policies, laws, regulations, spectral congestion, likelihood of receiving or causing interference, and/or similar considerations. A cognitive radio can take many forms and have varying degrees of "situational awareness" that permits the cognitive radio to select (or have selected for it) an appropriate operational policy. The CR can then configure itself (or be configured) and operate to carry out radio communications according to the operational policy. The term "smart radio" is also sometimes used to describe this type of radio.

"Situational awareness" implies that the cognitive radio is aware of its operational environment to some degree. That situational awareness may be obtained by virtue of the CRs capability to sense parameters such as spectral utilization, or sense or be made aware of position and movement of the CR (e.g., in a car or plane by GPS signals or other means), or by virtue of querying of or receipt of updates from other nearby cognitive radios or other authorities to obtain such situational awareness. This situational awareness is used by the CR in order to establish or receive an appropriate operational policy for use in a given situation in order to achieve efficient or reliable communication.

An assumption to be used in considering the functioning of a cognitive radio is that a common signaling and communication mechanism should be available to all CRs (or at least all CRs in a particular collection of CRs). This assumption permits the cognitive radios to communicate at a basic level to permit configuration of a group of cognitive radios for communication among themselves and to exchange information contributing to situational awareness to aid in optimizing communication. Two possibilities are proposed for achieving this functionality. In the first, an agreed upon standard protocol is established in which all CRs possess the native ability to communicate. In the second, cognitive beacons are provided which act as translators between normally incompatible protocols to permit communication among cognitive radios. In either case, however, the present document presumes establishment and existence of such a common mechanism for communication between CRs. At this writing an accepted protocol has not been established, but it is clear that establishment of such a protocol is a formality and a matter of national and/or international regulatory agreement, convention, treaty, etc., with no substantial technical barriers to be overcome. The presence of agreements at this time on such a specified mechanism is not necessary to the understanding of the present embodiments.

FIG. 1 depicts a simplified embodiment of a software defined radio capable of operation as a cognitive radio 100. Such CR 100 incorporates a radio frequency (RF) transceiver 104 that is configurable under software control by instructions received from a control processor (e.g., a microprocessor or microcontroller) 108 in order to establish an air interface used by the transceiver 104 to carry out suitable communications. Received analog radio waves are downconverted by the receiver section of the RF transceiver 104 and converted to digital by A/D converter 112 for processing by a programmable digital signal processor (DSP) 116. Similarly, digital data (which may include digitized voice) is passed from the DSP 116 to D/A 120 for transmission by the RF transceiver 104's transmitter. Analog to digital and digital to analog conversion may be bypassed in certain embodiments of digital communication scenarios.

The programmable DSP 116 operates under control of control processor 108 which configures the DSP for the particular policy in use at the time. A user interface 124 provides audio or visual data to and from a user of the cognitive radio 100. Control processor 108 has an associated memory (or other suitable storage) 130 that stores instructions that are used to process the policy actions of the cognitive radio 100. Memory 130 includes working memory 134 carrying programs and operating system and satisfies other such storage requirements. A portion of memory 130 may also be reserved for storage of parameters of a currently active policy at 138. Another portion of memory 130 may be used to store policy templates at 142, while still another part of memory 130 may store situational awareness data at 146 used by the cognitive radio 100. Situational awareness data can be received from many sources including GPS data, data received via the receiver of RF receiver 104, user input, sensors, etc. For simplicity, this situational data are represented as coming from block 150, but the presence of a single block representing a source of this data should not be construed to be limiting in any way. Situational awareness data input are represented this way purely for conceptual convenience without regard for the hardware which might be employed to produce such data. A policy log 160 is also maintained according to certain embodiments in order to facilitate reuse of prior policy decisions that worked well in the past under similar or identical situations (e.g., location).

Memory 130 further incorporates, in certain embodiments, varying forms of policy selection algorithms 154 which depend upon numerous factors including, but not limited to, situational awareness data, reliability of situational awareness data, active policy, policy templates, logged policy data, etc.

Implementing policy changes in a cognitive radio is a complex issue involving many factors. In order to understand the complexity of the problem, it is instructive to consider several general operational considerations for a cognitive radio. First, one should recognize that as this technology evolves and as new CRs are developed and computing power available to the CR increases, a variety of CRs may be in communication, with each having varying knowledge, situational awareness, historical data and computing power. As a result, a cognitive radio should be able to adapt policy use decisions based upon a multitude of factors, not the least of which might be the ability to take advantage of a more powerful or more knowledgeable CR from which it can obtain valuable information to be used in establishing a suitable policy for a given situation.

Figure 2:
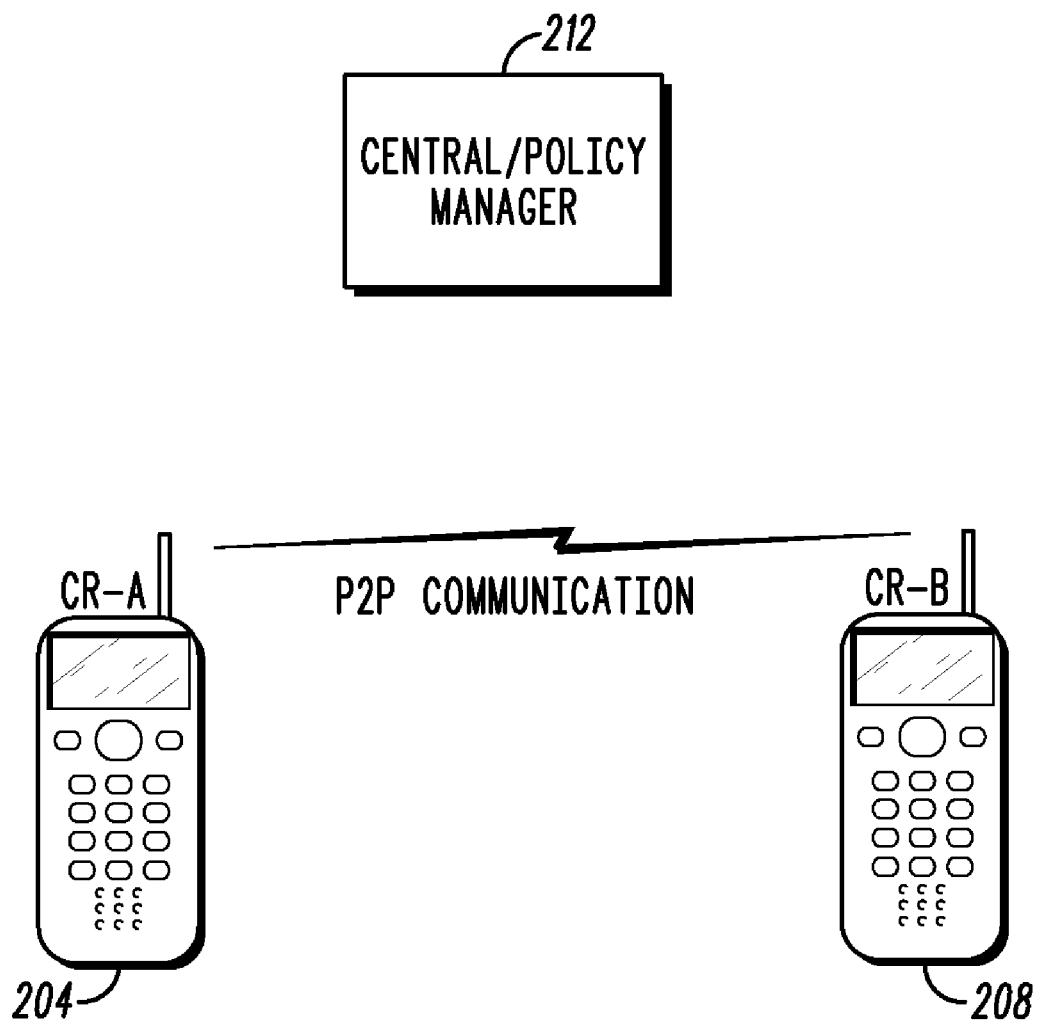
FIG. 2 is an example diagram illustrating a cognitive radio network in accordance with some embodiments of the invention.

Cognitive radios can be configured to operate in any number of ways. Consider FIG. 2 for example. In this example, a first cognitive radio CR-A (204) may directly communicate with a peer cognitive radio CR-B (208) in a so-called "point-to-point" (P2P) communication session. The CRs may establish a suitable policy for use in this point-to-point environment via any number of techniques including, but not limited to, the CRs' situational awareness, negotiation with each other, consultation with other CRs in range, or consultation with a central (or local or regional) policy manager 212.

Figure 3:
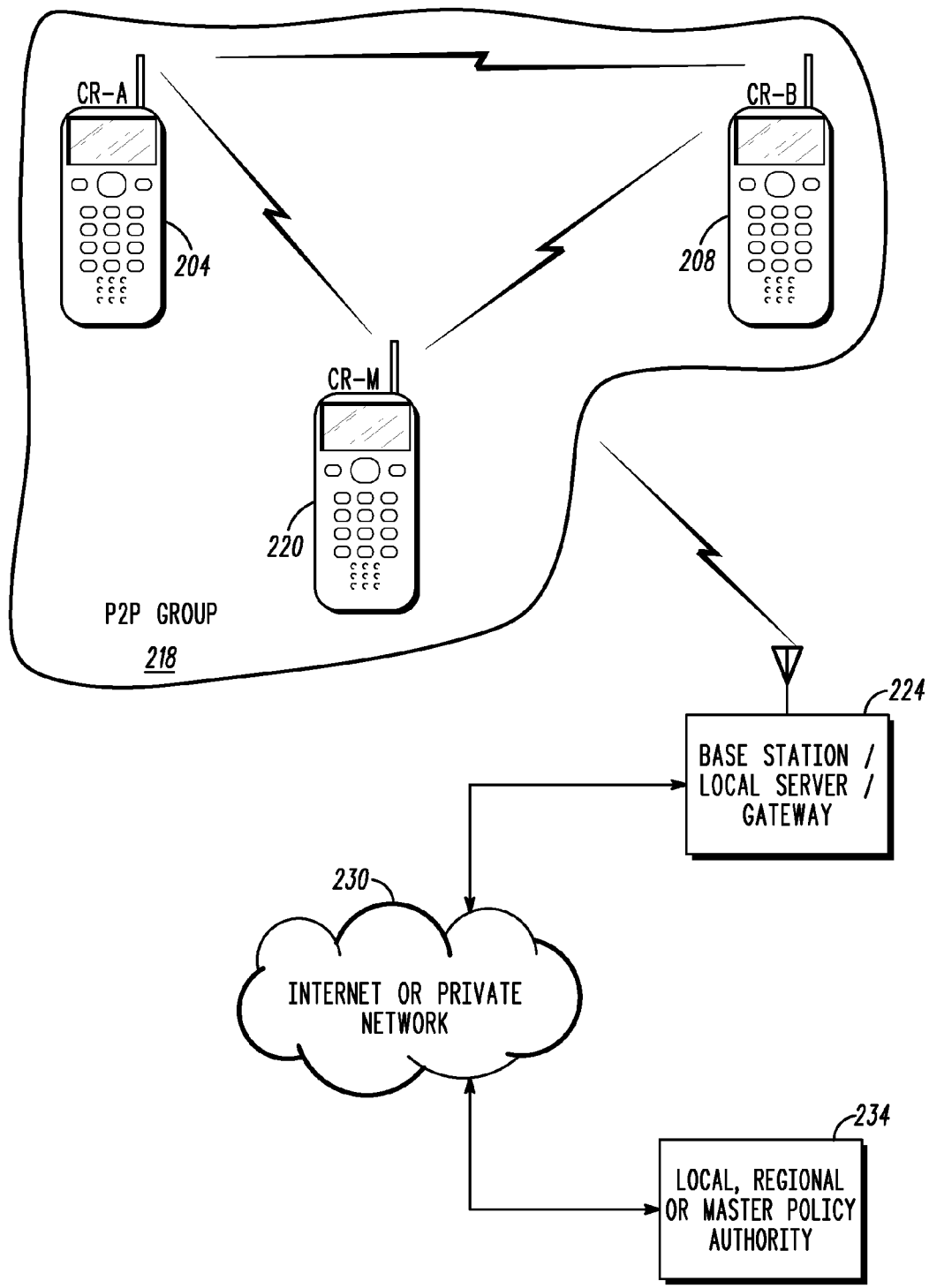
FIG. 3 is an example of another cognitive radio network in accordance with some embodiments of the invention.

Another, more elaborate, example environment for cognitive radio communication is depicted in FIG. 3 in which any number of hierarchies may be utilized for obtaining the situational awareness necessary for obtaining an appropriate operational policy. Generally speaking, the depicted hierarchy of authority in policy decision making increases from top to bottom in this illustration. In this example, a peer-to-peer group 218 is depicted as having three member cognitive radios—204, 208 and CR-M 220. In this example, the group 218 may operate as an autonomous communication group, or may utilize the services of a base station or repeater 224 in a more or less conventional manner once an appropriate policy is established for such communication. The reader is reminded that all CRs are presumed to be able to communicate using a common signaling protocol in order to establish or change a policy.

In communication group 218, one member may be established as a "master" who can dictate policy to the others in the communication group. In this case, assume that CR-M (220) is such a master. If for any reason the master wishes to change policy (either autonomously, or under user instruction) CR 220 can dictate that change to the subordinate CRs 204 and 208 using appropriate signaling. Envision, by way of example, that CR 220 is controlled by a sheriff or military commanding officer, who deems that the policy should be changed to permit communication with a broader range of personnel operating together in an emergency situation or to adapt to loss of communication with a member of the group.

When base station 224 is in a position to assist with policy decisions, such decisions may be implemented either by assistance of the computing power available at the base station, or may be dictated by the base station, operating in the role of a more computationally powerful cognitive radio itself. Additionally, base station 224 may operate in the capacity of a gateway that utilizes either a private data network or the Internet 230 to obtain additional assistance, or policy instructions from a local, regional or master policy authority 234. Hence, a cognitive radio may take advantage of numerous resources at its disposal, in addition to any locally or internally generated situational awareness data available to it in order to make policy decisions.

Figure 4:
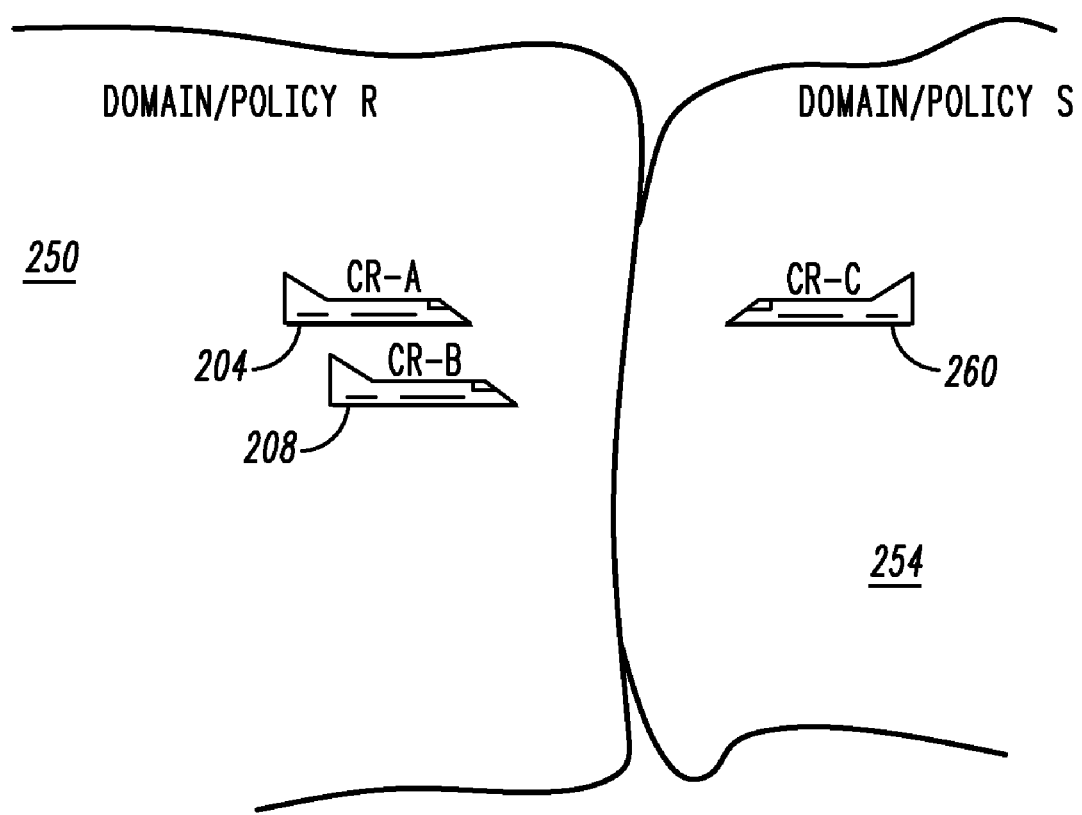
FIG. 4 is an example illustration of a change of domains of a cognitive radio in accordance with some embodiments of the invention.
Figure 5:
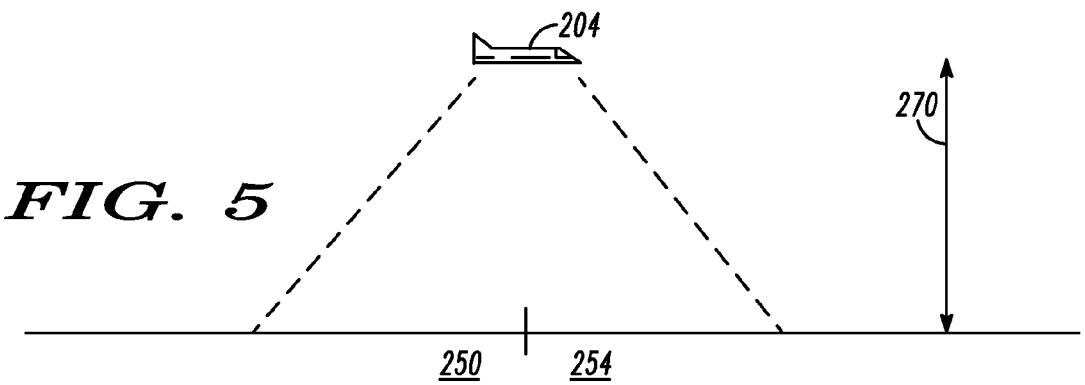
FIG. 5 is another example illustration of a change of domains of a cognitive radio in accordance with some embodiments of the invention.
Figure 6:
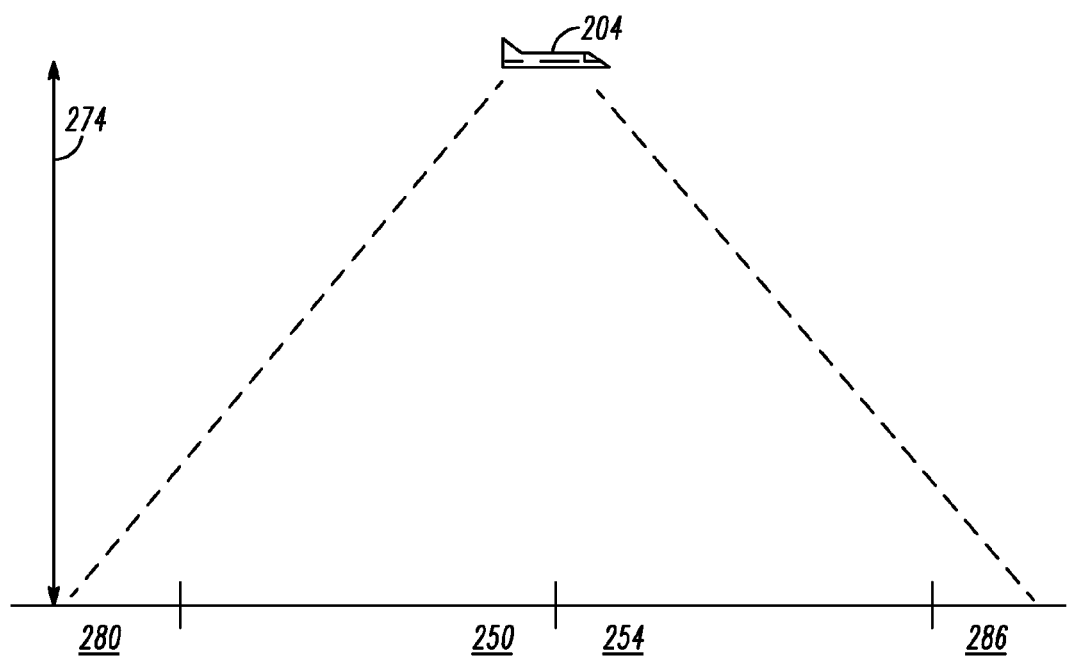
FIG. 6 is another example illustrating a change of domains of a cognitive radio in accordance with some embodiments of the invention.

Now consider the role of movement as depicted in FIG. 4-6 in making policy decisions. In this example, a pair of CRs (again 204 and 208) are in communication with each other. In this example, the CRs are depicted as traveling from left to right within or as a part of an aircraft. This example could equally well have depicted those CRs traveling in an automobile, train, military vehicle, etc. CR 204 and 208 are shown to be currently operating within a domain 250 that uses policy R, but are approaching a domain 254 with policy S. This is most readily visualized as representing travel across the boundary from one nation to another wherein different regulatory authorities establish the rules of radio communications within their boundaries. Also depicted is a third CR 260 (CR-C) traveling from domain 254 toward domain 250 from right to left. Hence, CR 260 is operating under an appropriate policy S for domain 254. In this example, the CRs 204, 208 and 260 may modify their policies in any number of ways. For example, the various CRs may travel this route frequently and may therefore have stored in their memory an appropriate set of policies and suitable information on when and how to change those policies as they approach the new domain. In other embodiments, the three CRs may query each other to determine an appropriate policy for use.

It should be noted that three policies may be required as the CRs make their way across the regulatory boundary into the adjacent domain. While in domain 250, one policy may be used, while in domain 254 another policy might be used and during their transition between domains, a third commonly workable policy might be used. Note that while a particular CR is near a border between domains, it may have to accept a compromise policy that may be undesirable for various reasons (e.g., congestion, poor throughput, etc.), but since near the border transmissions have the potential of causing interference the policy decision should take this into account. Once a domain barrier has been crossed and the potential for interference near the transitional region is gone or minimized, the policy may be changed again in order to maximize throughput.

The example of FIG. 4 is somewhat two dimensional, which may be a realistic assumption when, for example, the cognitive radios are transported via ground transportation, or when a border involves only two domains or even when the transmitted power is very low. This situation is further depicted in FIG. 5 in which the altitude 270 is relatively low or the border between domains is relatively isolated from other domain borders. However, consider the depiction of FIG. 6 in which the altitude 274 is much higher and more than two borders are involved. In this example, domains 250 and 254 are joined by domains 280 and 286 as being relevant to the receipt of transmissions from CR 204. One can readily envision areas, for example in Europe, where multiple boundaries converge in which the scenario depicted is realistic and to be contended with. Hence, the three dimensional aspect of the decision making for establishing a communication policy for CR 204 comes into play. In addition to compliance with regulatory issues associated with each domain, an effective communication mechanism may be needed which has suitable throughput for a particular application. Simultaneously, creation of interference should be avoided. Hence, geographical position in three dimensional space may need to be taken into consideration in order to establish an appropriate communication policy that meets a "least common denominator" constraint on a selected policy.

Figure 7:
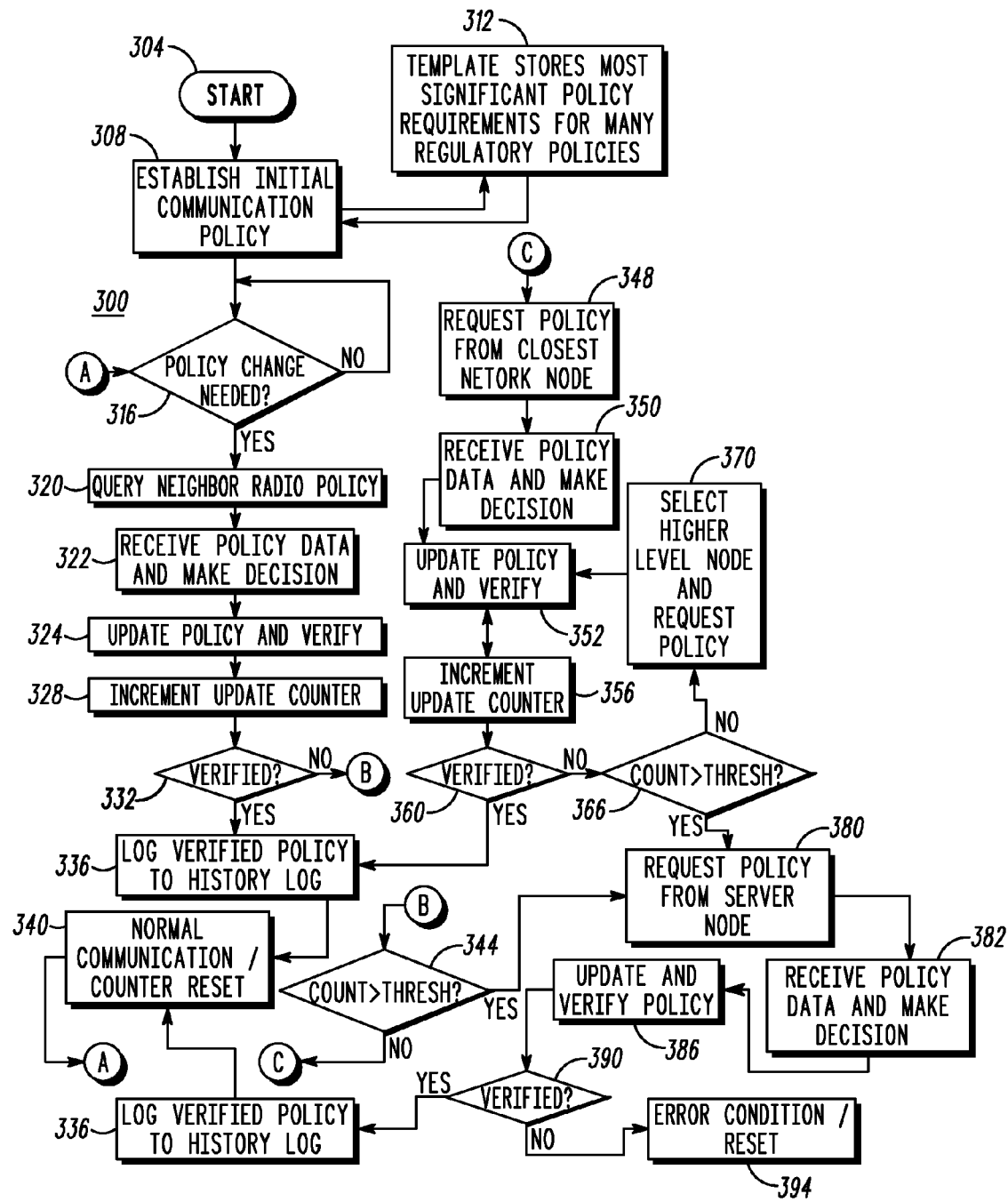
FIG. 7 is a flow chart of an example hierarchical process for changing policies of a cognitive radio in accordance with some embodiments of the invention.

Now consider an exemplary process for acquiring policy related information as depicted as process 300 of FIG. 7 starting at 304. When a cognitive radio is first activated, an initial operational policy is established at 308. Such policy may be based on policy templates stored in memory 130 at 312, as well as historical data and any situational awareness data that might be available. In certain embodiments, the initial startup may also involve transmission of a beacon, a response to which may dictate or suggest a policy or provide enhancements to existing situational awareness. In any event, an initial communication policy is established at 308 which is used until there is a determination at 316 that a policy change should be implemented. Such a determination may be based upon a number of factors including: time, 2 dimensional or 3 dimensional location, velocity and direction of travel, interference, communication quality or failure, data throughput, domain change, signal quality or strength assessments, and other situational awareness data.

When a policy change is to be implemented at 316, an exemplary hierarchical approach involves first querying neighboring cognitive radios for policy information at 320. When this document discusses a query of a neighbor (or any other entity) for policy information, this should be interpreted to mean a broad range of potential queries. For example, the query can involve one way or two way communication of any or all of the following information: capabilities or class of the querying radio, position of the querying radio, velocity of travel or other information identifying impending domain change, identification of present policy in use, etc.

When this query is received by a neighbor CR, the neighbor may reply in any number of ways. For example, the response may involve communication of any or all of the following information: a code representing a full set of policy information being used by either the responding cognitive radio, a code representing a full set of policy, information that is within the capabilities of the querying radio, a set of suggested or dictated policy parameters, a compressed set of suggested or dictated policy parameters, data representing a policy difference (e.g. —a message stating that the same policy can be used with power reduced from 5 watts to 1 watt), information relating to spectral congestion or interference in the domain being approached, a metric describing the reliability of information being provided, capabilities of the responding radio, situational awareness data, a radio identifier, etc.

Once the policy data are received at 322, a decision is made (unless the policy is dictated) as to the policy changes that are to be made. The policy is then updated and verified at 324 to assure suitable functionality of the new policy. A policy update counter can then be incremented at 328 in order to keep track of attempts at establishment of an operative policy. At 332, if the policy is verified as suitable, the policy is logged to the policy log along with data identifying appropriate situations for its use (e.g. time, position, velocity, etc.) at 336. Normal communication functions then ensue at 340 and the update counter is reset. Control then returns to 316 to await the next policy change.

However, in the event the policy is not verified at 332, the count of the update counter is compared with a threshold at 344. If the established threshold for number of attempts to update the policy with a viable policy has not been reached, either the process can return to 320 to find a new peer neighbor radio with better information (not shown for ease of illustration), or the policy request can be escalated to a network node (as depicted in this example) at 348. Hence, at 348, a network node (or similar higher level authority) is queried (e.g., a local base station or master or through a local base station or via point-to-point communication).

Policy information is then received at 350 and a new policy decision can be made. The policy is then updated and verified at 352 and the update counter is incremented at 356. If the new policy is verified at 360, control passes back to 336. Otherwise, control passes to 366 for another inspection of the policy update counter. If the threshold count has still not been reached at 366, then control passes to 370 where a higher level authority can be sought and selected to request new policy data. The process then repeats starting at 352. (In a similar manner, multiple neighbor peer radios can be repeatedly queried until a count is exceeded—this process has been omitted to simplify the flow diagram).

When an update count exceeds (or meets) the threshold value, control passes to 380 where a policy request is sent to the highest level server node that can be reached. Policy data are then received at 382 and a new policy decision made. The policy is then updated at 386 and if verified at 390, control passes to 336. If this policy cannot be verified at 390, an error condition is presumed to exist at 394. This can result in any number of corrective actions including a full software reset of the radio and/or presentation of alerts or other error messages.

As previously implied, a cognitive radio CR should quickly identify the policies that apply to it based on its current location, movements and time of day, for example along with other parameters. This is particularly important for rapidly-moving radios, such as is found in aircraft traversing multiple countries or governing authorities. The radio should determine in real time whether it can transmit, and under what conditions should be used for transmission at its current location and time. The CR establishes a usage policy (for example by download from a database in an associated network, or by the process just outlined). A particular policy may only be valid for a certain geographic area. Hence, the cognitive radio can predict when a new policy will be needed as a function of its current location (in two or three dimensional space), signal propagation and a speed and direction of movement. Based upon this data an approximate expiration time can be calculated based on its current location and speed. Also, by sensing its altitude along with its known latitude/longitude (or other location coordinates), the CR can estimate transmit (Tx) propagation and thus decide how often to request a policy update/download.

As noted earlier, policy updates can either be downloaded from the network, or the CR can query neighboring CR's to obtain policy updates (in various formats such as a compressed, difference format). This latter approach is presumed to provide a much quicker update compared to downloading the entire policy from the network. Using the location, time, and propagation estimates, the CR chooses the most viable frequency and protocol (etc.) to use and verify that the defined policy is available/unused. It maintains a history log with policy, location, and interference info to assist in quickly determining how to best communicate (i.e. skip propagation estimate and/or policy update request if CR has already traveled this path before), using coarsely-quantized locations to save storage space. If a new policy is needed but one is not available for this location from either the network or neighboring radios, the CR will compare the last-used policy with a cached policy for the closest location to determine which subset of policy rules to apply. If after a policy change no valid data can be received (i.e., the policy is not verified), the policy used by the transmitter may be beyond this CR's capability, or their policies may be out of sync; the CR then transmits a trouble beacon signal to all. The network detects the beacon and attempts to resync all CR's with a policy usable to all (i.e. least-common denominator of usage capabilities).

Thus, in accordance with certain embodiments, the CR takes advantage of its location, capabilities, and info from neighboring CRs to rapidly determine the best policy for the geographic region. Local caching and decision-making may often eliminate the need to support frequent, large policy downloads.

Figure 8:
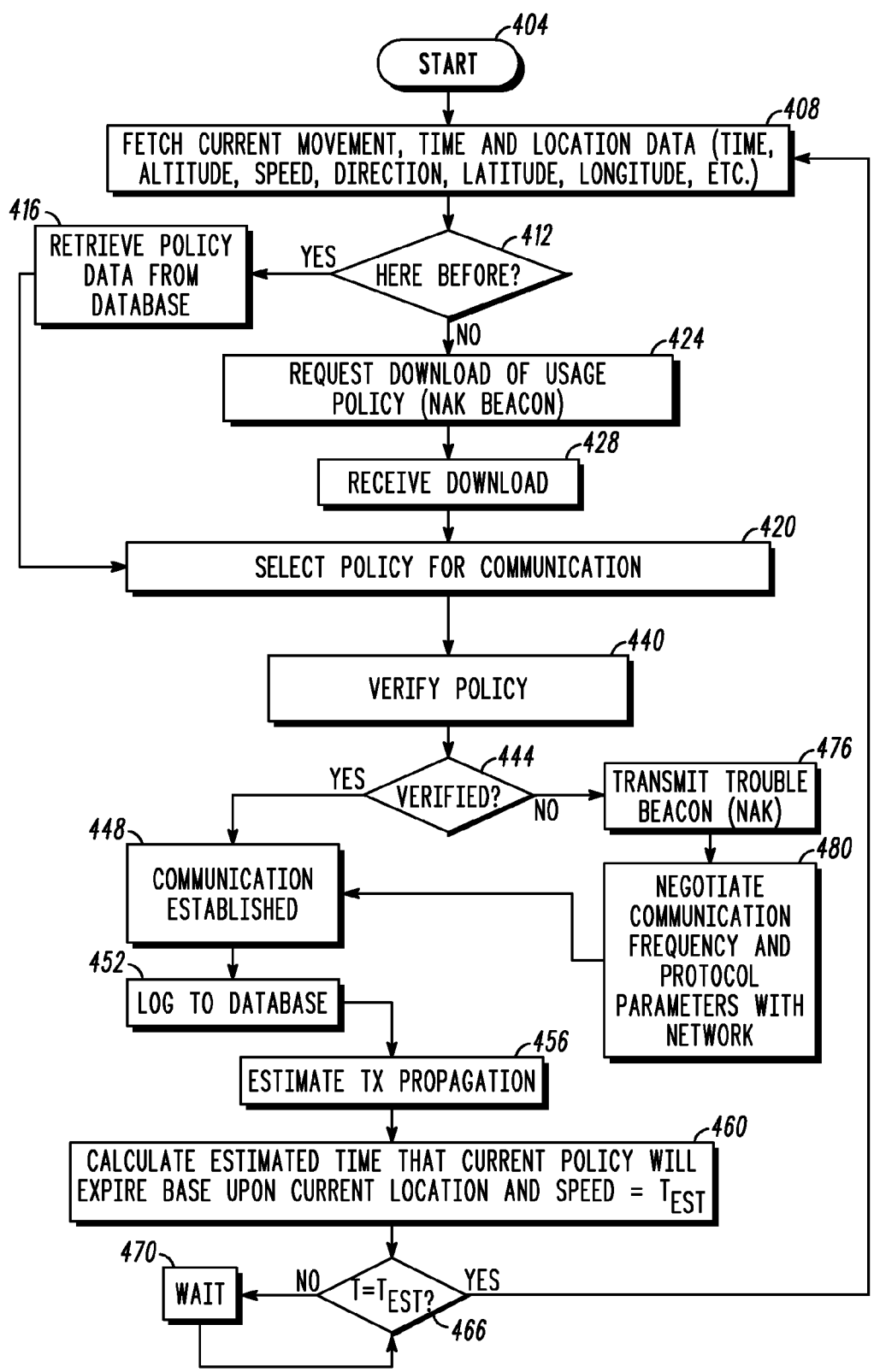
FIG. 8 is a flow chart of an example policy change process of a cognitive radio in accordance with some embodiments of the invention.

An exemplary flow chart of a process 400 of FIG. 8 starting at 404 depicts an example implementation of the procedures described above that may be utilized in certain embodiments. At 408, the current movement, time and location data including altitude, speed, direction, latitude, longitude, GPS coordinates, etc. are fetched. By reference to a database of logged policy information, the CR can then determine if this path or something close has been previously logged at 412. If so, the policy data can simply be retrieved from the CRs internal database in order to establish a likely functional policy for use at 416. A protocol, frequency, etc. (policy parameters) can then be selected for use in communication at 420.

However, if traveling in a new or unlogged area at 412, a policy can be requested by transmission of a query beacon at 424. A download can be received (e.g., as in FIG. 7) at 428 and a policy can be selected and implemented at 420. At 440, the policy is verified and if verified at 444, communication is established at 448. The policy and location and movement information can then be logged to the database at 452. However, if not verified, a trouble beacon can be transmitted at 476 and a negotiation for appropriate policy can be carried out at 480 in order to obtain an appropriate communication policy. Once communication is established at 448 and appropriately logged at 452, the cognitive radio's internal processor 108 can estimate a distance of propagation of the transmitted signal at 456. The CR can then estimate at 460 how long the present policy can remain active before another domain is approached by its propagated signal, and thus establish an expiration time estimate based on speed, path and geographical data. Such expiration time may slightly precede the actual last time frame that the policy can remain in use in order to permit acquisition of a new policy in time for a smooth transition between policies. Of course, such an estimate is just that—an estimate. The estimate may be refined to account for speed changes, course changes, weather and other situational awareness data, but once an established or refined time for expiration of the policy ($T_{est}$) is reached, at 466, control returns to 408 where the process repeats. Until such time as the expiration time is reached, the process simply waits at 470.

Computation of a time estimate for expiration of the current policy can be easily made once all of the appropriate data are determined or estimated. For example, if the propagation distance toward a new domain is four miles, and the speed of travel toward the new domain is one hundred twenty miles per hour, the new domain will be reached in 4/120 hour=2 minutes. Propagation estimates are readily made by reference to known formula, tables and charts.

The above process is centric to a single CR. But, if after a policy change no valid data can be received, the policy used by the transmitter may be beyond this CR's capability, or their policies may be out of sync. The CR can use transmission of a trouble beacon signal to signal surrounding devices of the problem. The network or other authority or neighboring devices can detect the beacon and attempt to resyncronize all CR's with a policy usable to all (i.e. least-common denominator of usage capabilities).

This concept can be expanded to incorporate a methodology to induce change to an operational policy based on user/application hierarchy. By way of an example: a chief police officer is in location that his communication with the rest of group is failing due to inadequacy of operational policy being used. He/his radio, acting as a master cognitive radio in the group, will have authority to change the current policy and request other members to re-synchronize with the new policy. That is, an entity of higher place in the hierarchy can demand a resynchronization and can dictate the parameters of the re-synchronization, even including dictating that certain radios (e.g., those that might fall into enemy hands, are disabled or deauthorized).

In establishing a new policy, among a group of communicating cognitive radios, in certain embodiments, a new policy is implemented by first synchronizing timing of the radios and then transmitting a new policy to all radios. In the event the new policy is beyond the capabilities of a particular radio, it can signal this fact by use of a trouble beacon. In response, the master can query the radio as to its capabilities and change the policy to one having capabilities common to all radios in the group. In other circumstances, certain members of the group can be excluded from the group (i.e., disabled) in order to establish a policy with the remaining group members. The different members of the group may be performing different roles, functions, applications, services, etc. Also, each of the different members of the group might be capable of only certain functions or capabilities that might or might not be needed at a certain time. There may thus be a need to provision communications on a temporary or ongoing basis for only a subset of proximal users and/or nodes. Thus, certain radios in the hierarchy could be temporarily disabled (e.g., certain non-key members/applications) in order to create an operational environment with adequate amount of resource for the key individuals/applications.

Consider the embodiment described in connection with FIG. 9. This represents a communication flow between two radios CR-A and CR-B. This exchange begins at 504 with a query from CR-A to CR-B as to whether CR-B is using a particular rule X. At 508, CR-B replies "no" after which rule X is supplied to CR-B from CR-A at 512. It is then up to CR-B to either acknowledge (ACK) or not acknowledge (NAK) based upon whether or not the rule can be used based upon the capabilities of CR-B at 518. A NAK message may be essentially the same as a trouble beacon in some embodiments. Responsive to the NAK, CR-A initiates a re-synchronization with a different policy at 522.

Figure 10:
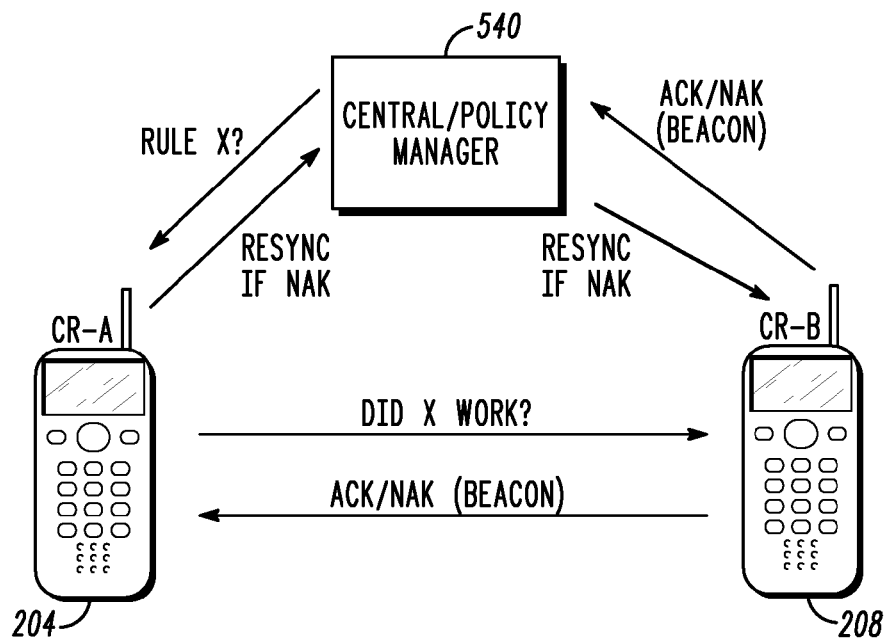
FIG. 10 is an example communication flow diagram between cognitive radios and a central/policy manager in accordance with some embodiments of the invention.

A similar policy management scenario can be implemented as depicted in FIG. 10 wherein a local, regional or central policy manager dictates the policy to be used. Such manager 540 may also be another CR with a higher rank in a group's hierarchy. In this embodiment, a policy may be dictated as depicted by transmission of rule X (i.e., a new policy). If rule X does not work to establish the communication link desired, a NAK (beacon) can be transmitted in order to initiate a re-synchronization.

Figure 11:
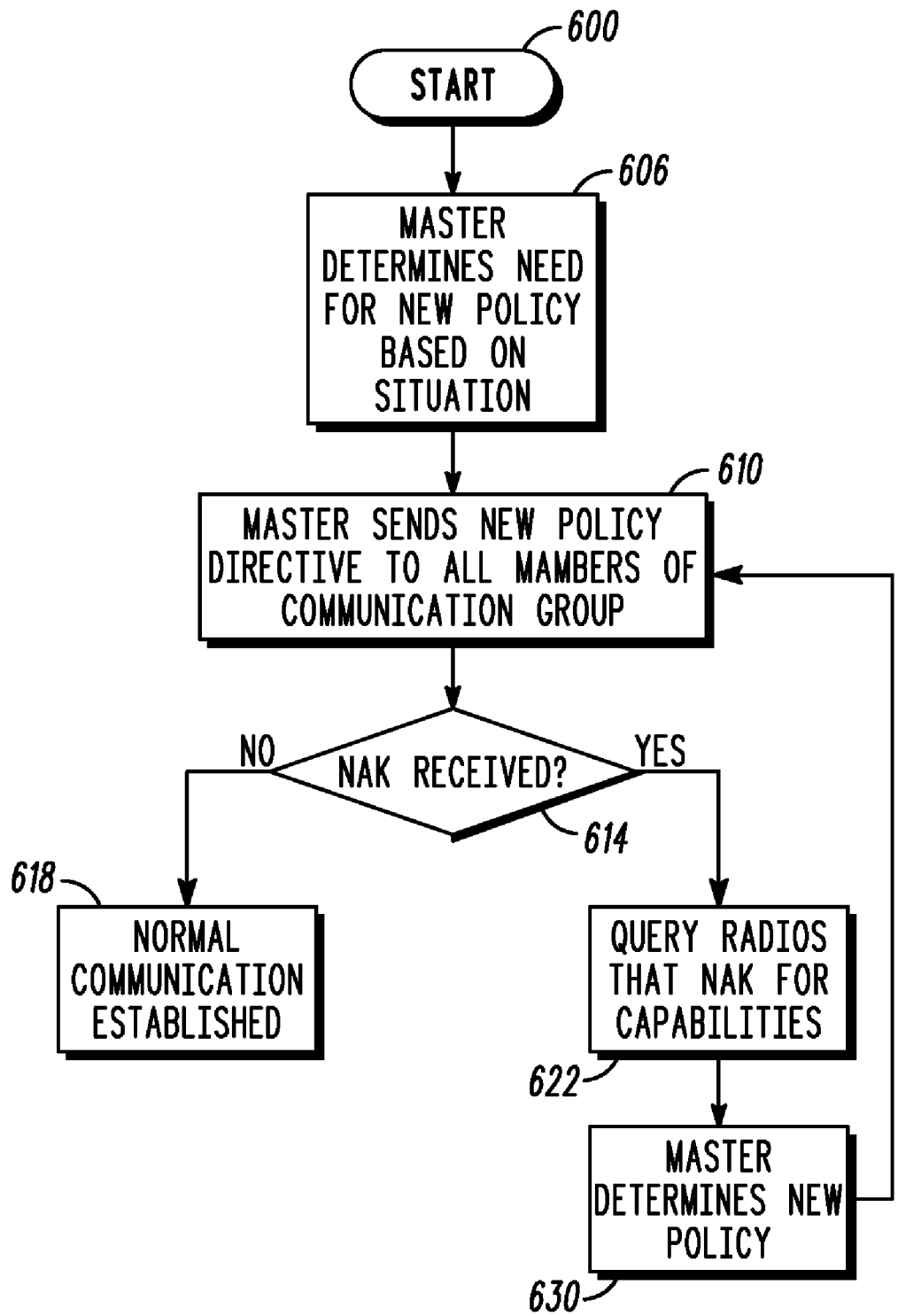
FIG. 11 is a flow chart of a communication process using a master cognitive radio in accordance with some embodiments of the invention.

A process for a policy manager or master cognitive radio to change a policy in accordance with certain embodiments is depicted in FIG. 11 starting at 600 after which the master determines at 606 that there is a need for a new policy. Such decision can be based upon any given motive including disabling certain radios or classes of radios or inability of certain radios to communication. Once this determination is made at 606, the master sends a new policy directive is transmitted to all desired members of the communication group at 610. Once the directive is received by the radio group, the master listens for receipt of a NAK beacon from any of the desired communication group members. If a NAK is not received at 614, normal communication ensues at 618. However, if a NAK beacon is received at 614, the master queries the radios that sent the NAK beacon to determine their capabilities at 622. The master then makes a determination of a suitable policy having common communication abilities for all members of the desired group at 630. Control then returns to 610 where the new policy is transmitted as a directive to the communication group. Implementation of the directed new policy may involve first synchronizing all the radios followed by implementing the policy at a specified time.

Thus, a cognitive radio (CR) quickly identifies the policies that apply to it based on its current location and time of day, even for rapidly-moving radios, such as is found in aircraft traversing multiple countries or governing authorities. The radio determines in real time whether it can transmit, and under what conditions apply for its location and time. The CR downloads a usage policy from a database in an associated network. The policy is defined to be valid for a certain geographic area and timeframe, and the user calculates an expiration time based on its current location and speed. Also, by sensing its altitude along with its known lat/longitude, the CR can estimate transmit (Tx) propagation and thus decide how often to request a policy update/download.

Policy updates can either be downloaded from the network, or the CR can query neighboring CR's to obtain policy updates (e.g., in a compressed, difference format). This latter approach provides a quicker update compared to downloading the entire policy from the network. Using the location, time, and propagation estimates, the CR chooses the most viable frequency and protocol and/or other policy elements to use and verify that the frequency is available/unused. The cognitive radio maintains a history log with policy, location, and interference info to assist in quickly determining how to best communicate (i.e. skip prop estimate and/or policy update request if already traveled this path before), using coarsely-quantized locations to save storage space. If a new policy is needed but one is not available for this location from either the network or neighboring radios, the cognitive radio compares the last-used policy with a cached policy for the closest location to determine which subset of policy rules to apply. If after a policy change no valid data can be received, the policy used by the transmitter may be beyond this cognitive radio's capability, or their policies may be out of sync; the CR then transmits a Trouble Beacon signal to all. The network detects the beacon and attempts to resynchronize all cognitive radio's with a policy usable to all (i.e. least-common denominator of usage capabilities).

The CR takes advantage of its location, capabilities, and information from neighboring CRs to rapidly determine the best policy for the geographic region. Local caching and decision-making eliminates the need to support frequent, large policy downloads.

Thus, if after a policy change no valid data can be received, the policy used by the transmitter may be beyond this CR's capability, or their policies may be out of sync; The CR then transmits a Trouble Beacon signal to all. The network detects the beacon and attempts to resync all CR's with a policy usable to all (i.e. least-common denominator of usage capabilities).

A computer readable electronic storage medium can be used to store instructions that, when executed on a programmed processor, carries out any of the processes described above.

Thus, A master cognitive radio consistent with certain embodiments has a software configurable transceiver; A control processor executes program instructions to implement: establishing a first operational policy for the group of cognitive radios; determining that the operational policy is unsuitable for use by at least one member of the group; and the master cognitive radio dictating a change in the operational policy used by the group to a second operational policy for use by the group.

In certain embodiments, the determination that the operational policy is not suitable comprises determining that the operational policy based upon the received policy information being beyond the capabilities of at least one of the cognitive radios in the group. In certain embodiments, the determination that the operational policy is not suitable comprises receiving a beacon signal from at least one of the cognitive radios in the group. In certain embodiments, In certain embodiments, the beacon contains a description of the capabilities of the cognitive radio. In certain embodiments, In certain embodiments, at least one of the first and second operational policies is obtained by reference to a database within the master cognitive radio. In certain embodiments, a digital signal processor processes transmitted and received data from and to the master cognitive radio's transceiver respectively, and establishing at least one of the first and second operational policies further involves configuring the digital signal processor with parameters of the at least one of the first and second operational policies. In certain embodiments, the dictated change in operational policy comprises synchronizing timing of all cognitive radios in the group and sending a second operational policy to the group of cognitive radios. In certain embodiments, the second operational policy is downloaded from a server. In certain embodiments, the determining involves querying a cognitive radio in the group to determine its operational capabilities. In certain embodiments, the second operational policy includes a prohibition of at least one radio from communication.

In another embodiment, a cognitive radio has a software configurable transceiver. A control processor executes program instructions to implement: receiving policy information; determining that an operational policy based upon the received policy information is not suitable for use by the cognitive radio; and transmitting a beacon requesting new policy information.

In certain embodiments, the determination that the operational policy based upon the received policy information is not suitable comprises determining that the operational policy is beyond the capabilities of the cognitive radio. In certain embodiments, the beacon contains a description of the capabilities of the cognitive radio. In certain embodiments, a digital signal processor processes transmitted and received data from and to the cognitive radio's transceiver respectively, and the process of establishing at least one of the first and second operational policies further comprises configuring the digital signal processor with parameters of the at least one of the first and second operational policies.

In accordance with certain embodiments, a method of operation of a master cognitive radio in a hierarchical group of cognitive radios, where the hierarchy of cognitive radios includes at least one master cognitive radio that has a higher position in the hierarchy than another of the cognitive radios in the group involves: establishing a first operational policy for the group of cognitive radios; determining that the operational policy is unsuitable for use by at least one member of the group; and the master cognitive radio dictating a change in the operational policy used by the group to a second operational policy for use by the group.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of operation of a cognitive radio for acquiring policy related information comprising:
   determining whether a new communication policy for the cognitive radio is to be implemented;
   querying a neighbor cognitive radio for the new communication policy, in response to determining that the new communication policy is to be implemented;
   verifying whether the new communication policy received from the neighbor cognitive radio is suitable for use by the cognitive radio and operating the cognitive radio with the new communication policy received from the neighbor cognitive radio and communicating the new communication policy to at least one other cognitive radio associated with a group that includes the cognitive radio and the at least one other cognitive radio when the communication policy information is verified as being suitable for use by the cognitive radio;
   in response to verifying that the new communication policy received from the neighbor cognitive radio is not suitable for use by the cognitive radio, querying a network node for the new communication policy;
   verifying whether the new communication policy received from the network node is suitable for use by the cognitive radio and operating the cognitive radio with the new communication policy received from the network node and communicating the new communication policy to the at least one other cognitive radio associated with the group when the new communication policy received from the network node is verified as being suitable for use by the cognitive radio;
   in response to verifying that the new communication policy received from the network node is not suitable for use by the cognitive radio, querying a server node for the new communication policy.

2. The method of claim 1, further comprising:
   prior to determining that the new communication policy needs to be implemented, operating the cognitive radio using an initial communication policy.

3. The method of claim 2, wherein operating the cognitive radio using the initial communication policy further comprises obtaining the initial communication policy either from a database of the cognitive radio or from at least one of the neighbor cognitive radio, network node or server node.

4. The method of claim 1, wherein querying the neighbor cognitive radio for the new communication policy further comprises:
   receiving the new communication policy from the neighbor cognitive radio for use by the cognitive radio; and
   in response to receiving the new communication policy from the neighbor cognitive radio, incrementing count of a policy counter.

5. The method of claim 1, further comprising:
   in response to operating the cognitive radio with the new communication policy received from the neighbor cognitive radio, adding the new communication policy to a history log of the cognitive radio.

6. The method of claim 4, further comprising:
   verifying whether the count is greater than a threshold value;
   querying either at least one other neighbor cognitive radio or the network node for the new communication policy for the cognitive radio when the count is less than the threshold value; and
   querying the server node for the new communication policy for the cognitive radio when the count is greater than the threshold value.

7. The method of claim 1, wherein querying the network node for the new communication policy further comprises:
   receiving the new communication policy from the network node for use by the cognitive radio;
   in response to receiving the new communication policy from the network node, incrementing count of a policy counter.

8. The method of claim 1, further comprising:
in response to operating the cognitive radio with the new communication policy received from the network node, adding the new communication policy to a history log of the cognitive radio.

9. The method of claim 7, further comprising:
verifying whether the count is greater than a threshold value;
querying a higher level authority when the count is less than the threshold value; and
querying the server node for the new communication policy for the cognitive radio when the count is greater than the threshold value.

10. The method of claim 1, wherein querying the server node for the new communication policy further comprises:
receiving the new communication policy from the server node for use by the cognitive radio; and
verifying whether the new communication policy received from the server node is suitable for use by the server node.

11. The method of claim 10, wherein verifying whether the new communication policy received from the server node is suitable for use by the server node comprises:
operating the cognitive radio with the new communication policy received from the server node when the new communication policy is verified as being suitable for use by the cognitive radio; and
resetting a software of the cognitive radio or presenting an error message when the new communication policy received from the server node is verified as being not suitable for use by the cognitive radio.

12. The method of claim 1, further comprising:
determining that the new communication policy is unsuitable for use by the at least one other cognitive radio associated with the group.

13. The method of claim 12, further comprising:
in response to determining that the new communication policy is unsuitable for use by the at least one other cognitive radio associated with the group, re-synchronizing the cognitive radio and the at least one other cognitive radio in the group with a communication policy usable by the cognitive radio and the at least one other cognitive radio.

14. The method of claim 12, further comprising:
in response to determining that the new communication policy is unsuitable for use by the at least one other cognitive radio associated with the group, prohibiting the at least one other cognitive radio from communication.

15. The method of claim 12, wherein determining that the new communication policy is unsuitable comprises receiving a beacon signal from the at least one other cognitive radio in the group indicating that the new communication policy is unsuitable.

16. The method of claim 15, wherein the beacon signal contains a description of the capabilities of the at least one other cognitive radio in the group.

* * * * *

UNITED STATES PATENT AND TRADEMARK OFFICE
CERTIFICATE OF CORRECTION

PATENT NO. : 8,010,102 B2  Page 1 of 1
APPLICATION NO. : 12/780409
DATED : August 30, 2011
INVENTOR(S) : Glick et al.

It is certified that error appears in the above-identified patent and that said Letters Patent is hereby corrected as shown below:

In the Drawings:

Fig. 7, Sheet 6 of 9, for Tag "348", in Line 3, delete "NETORK" and insert -- NETWORK --, therefor.

Fig. 8, Sheet 7 of 9, insert Tag -- 400 --.

Figure 9:
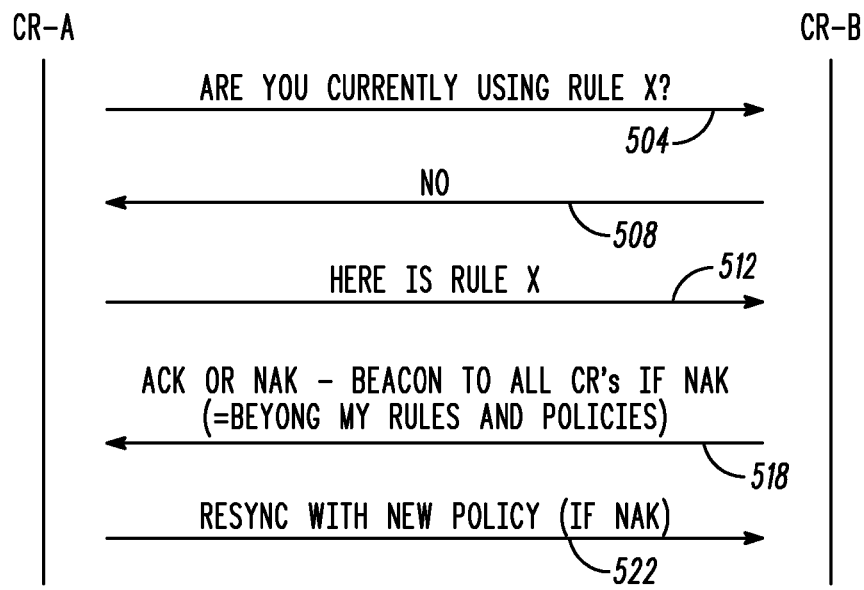
FIG. 9 is an example signal flow diagram between two cognitive radios in accordance with some embodiments of the invention.

Fig. 9, Sheet 8 of 9, for Tag "518", in Line 2, delete "=BEYONG" and insert -- =BEYOND --, therefor.

Fig. 11, Sheet 9 of 9, for Tag "610", in Line 2, delete "MAMBERS" and insert -- MEMBERS --, therefor.

Signed and Sealed this
Sixteenth Day of April, 2013

Teresa Stanek Rea
*Acting Director of the United States Patent and Trademark Office*